Sept. 14, 1965    R. A. DAVIS ETAL    3,205,922
CONTROLLABLE AUTOMATIC SHUTOFF
DISPENSING NOZZLE VALVE
Filed July 19, 1963
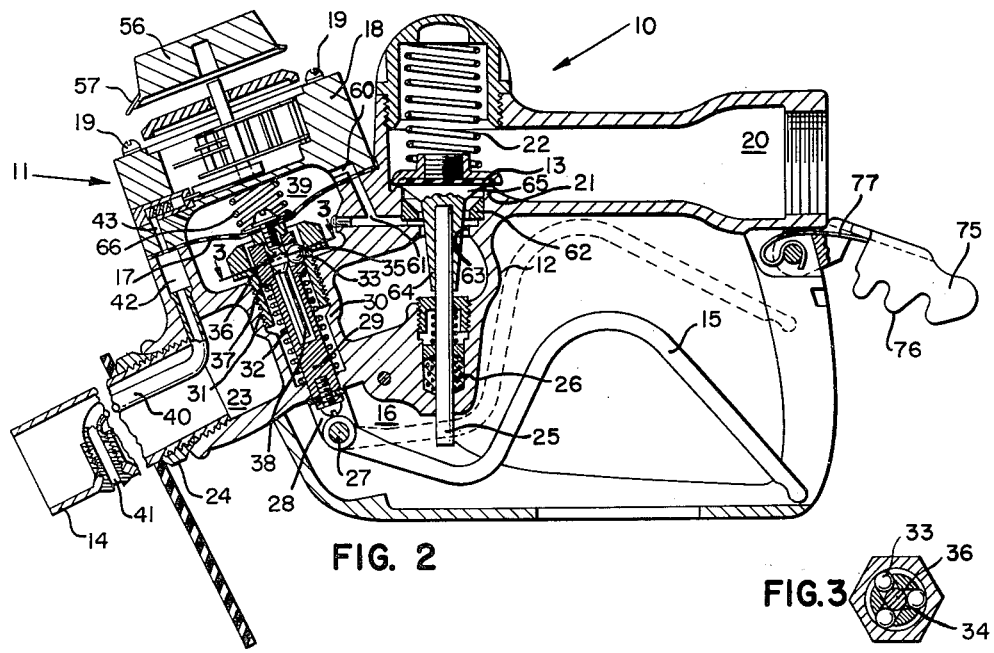
FIG. 2
FIG. 3
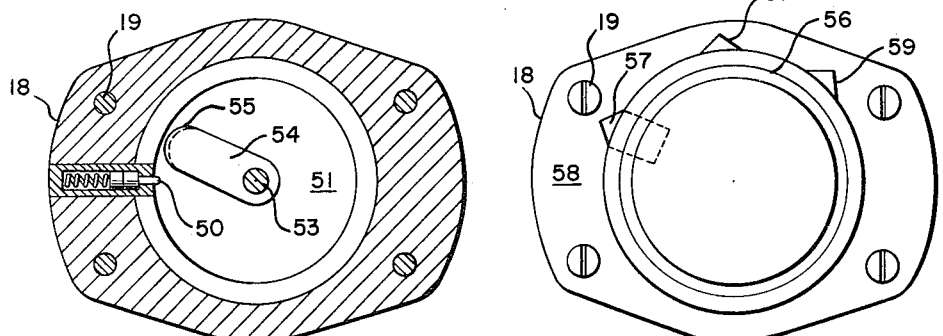
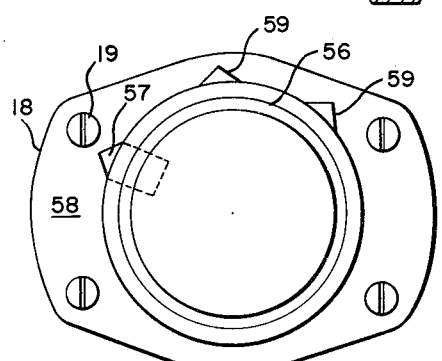
FIG. 6        FIG. 5
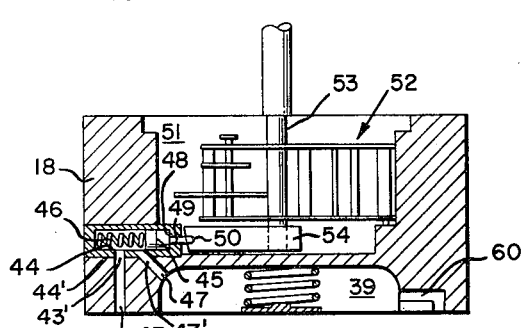
FIG. 4
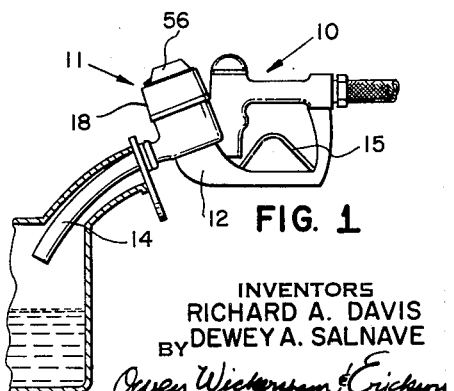
FIG. 1
INVENTORS
RICHARD A. DAVIS
DEWEY A. SALNAVE
BY
Owen, Wickersham & Erickson
ATTORNEYS United States Patent Office 3,205,922
Patented Sept. 14, 1965

3,205,922
CONTROLLABLE AUTOMATIC SHUTOFF
DISPENSING NOZZLE VALVE
Richard A. Davis and Dewey A. Salnave, San Leandro, Calif., assignors to Dover Corporation, Cincinnati, Ohio, a corporation of Delaware
Filed July 19, 1963, Ser. No. 296,308
2 Claims. (Cl. 141—209)

This invention relates generally to fluid flow control valves or nozzles, and more particularly, it relates to an improved automatic nozzle for dispensing a predetermined amount of liquid.

Almost all gasoline service stations are provided with gasoline pump hoses having nozzles with a valve which automatically cuts off the flow of gasoline when the car's tank has been filled. This enables the station attendant to place the nozzle in the tank opening and then perform other service tasks for the customer as the tank is being filled. Such nozzles heretofore devised were adequate under the aforesaid circumstances. However, prior to the present invention, in instances where a customer requested a quantity of gasoline amounting to less than a filled tank, an attendant was required to monitor the pump gauge visually to be assured of dispensing the exact amount of gas requested. This problem caused considerable loss of time and efficiency in the operation of service stations.

A primary object of the present invention is to provide a dispensing nozzle for a hose or conduit, and particularly for use with gasoline service stations that will automatically stop the flow of liquid therefrom after a predetermined quantity of gasoline or liquid has been dispensed through the nozzle. Our invention is therefore intended to solve the problem of relieving the service station attendant for other duties even when the customer's order is for a specific number of gallons rather than to fill the tank.

Another object of the present invention is to provide an automatically controlled nozzle that will dispense a predetermined quantity of fluid supplied to it at a substantially constant flow rate by automatically shutting off the flow after a preset elapse of time after the initiation of the flow.

Still another object of the present invention is to provide a shut off control device for a liquid dispensing nozzle on a conduit that can easily be installed on existing nozzles and which will enable such nozzles to shut off the flow automatically after supplying a predetermined amount of liquid.

Another object of the invention is to provide an automatic shut off device for a dispensing nozzle that is reliable and accurate in dispensing a predetermined amount of liquid and which is particularly well adapted for ease and economy of manufacture.

With these and other objects in view, the present invention contemplates an improved automatic nozzle control device for liquid dispensing systems which utilizes some of the structural elements of nozzles heretofore devised but which were limited to shutting off automatically only when the gasoline tank was filled. An example of such a dispensing nozzle is found in Patent Number 2,582,195 wherein a diaphragm controlling the main flow valve is automatically actuated only when the end of the nozzle is submerged or covered by the liquid in a filled tank. Our invention utilizes a similar type of diaphragm, but it provides a means for actuating the diaphragm after a predetermined time interval and before the end of the nozzle becomes submerged. By utilizing our nozzle with a standard pump having a known constant flow rate, the nozzle operator can preset the nozzle to automatically shut off after a predetermined amount of fuel has been dispensed.

Other objects, advantages and features of the invention will become apparent from the following detailed description of one embodiment thereof presented in accordance with 35 USC 112.

In the drawings:

FIG. 1 is a view in side elevation showing an automatic dispensing nozzle valve embodying the principles of the invention, the discharge end of the nozzle being shown in a partially filled container;

FIG. 2 is an enlarged view in side elevation and in section of the nozzle valve of FIG. 1;

FIG. 3 is a view in section taken along line 3—3 of FIG. 2;

FIG. 4 is an even greater enlarged view in section showing the diaphragm control valve in greater detail;

FIG. 5 is an enlarged plan view taken at line 5—5 of FIG. 2;

FIG. 6 is an enlarged view in section taken at line 6—6 of FIG. 2.

Referring to the drawings, FIGS. 1 and 2 show an automatic dispensing nozzle assembly 10 in combination with a valve shut off control device 11 embodying the principles of the invention. A number of the elements of the nozzle assembly 10, as shown here, may be similar to those shown in prior art nozzles and as described in U.S. Patent No. 2,582,195. However, the patented dispensing nozzle devices provided for automatic shut off only when the end of the nozzle became submerged when a gas tank was almost completely filled, whereas with the present invention having the controllable shut off control device 11, a service station attendant can preset the exact amount of gas ordered by the customer (e.g. 5 or 10 gallons) and while he is performing other service tasks on the automobile, the nozzle will dispense a predetermined amount of liquid and then automatically shut itself off.

The automatic nozzle valve assembly 10 shown in FIGS. 1 and 2 comprises a body 12 having a normally closed main valve 13 therein, a dispensing nozzle 14, a valve handle or lever 15 provided with a fulcrum 16, and a pressure responsive diaphragm mechanism 17, preferably of a flexible elastomeric material. The valve shut off control device 11 is contained within a housing 18 which is removably attached to the body 12 directly above the diaphragm mechanism 17 by a series of screws 19. With liquid flowing through the nozzle 14 at a predetermined rate from a constant flow pump, the control device 11 is operable to actuate the diaphragm mechanism 17 which is arranged to trip or release the fulcrum 16 to a position where the main valve 13 will automatically close. As in automatic shut off dispensing nozzle valves heretofore used, the automatic dispensing nozzle assembly 10 will also function to close the main valve 13 when the discharge end of the nozzle 14 is submerged in liquid to a predetermined depth.

The body 12 is provided with an inlet passageway 20 which leads to a valve seat 21 on which the main valve 13 is normally pressed or seated by a main spring 22. When the main valve 13 is open the inlet passageway 20 communicates with an outlet passageway 23 which in turn is connected to the discharge nozzle 14. The tubular nozzle 14 is threaded into the body 12 and is secured by a lock nut 24.

The main valve 13 is provided with a valve stem 25 which extends downwardly and outwardly of the body 12 through a packing gland 26. The lower end of the stem 25 is exposed to be engaged by the hand lever when the lever is actuated upwardly to lift the valve 13 off its seat against the force of the spring 22.

The end of the operating lever 15 is adapted to be held in a valve open position by pivoted latch member 75 having suitable teeth 76 for engaging the end of the lever. A spring 77 is preferably provided for urging the latch member 75 into the inoperative position illustrated in the drawings. The structure of the latch member 75 and spring 77 is conventional and well known in the art as shown and described in U.S. Patent No. 2,528,747.

The fulcrum 16 comprises a pin 27 on which the lever 15 is pivotally mounted. The pin is supported by a clevis or yoke 28 between the arms of which the pivoted end of the lever 15 is disposed. The yoke 28 is attached to the lower end of a connecting link or plunger 29. The plunger 29 is slidably disposed in a housing or sleeve 30 which is integral with the valve body 12, and an externally threaded sleeve 31, the latter being threaded into the sleeve 30. The plunger 29 is urged upwardly by a coiled spring 32, as shown, but is restricted in its travel by contact of the fulcrum 16 with the base of the body 12. The plunger 29 is urged downwardly by the main spring 22, as will be explained later.

When fluid is flowing through the nozzle 14, the plunger 29 is held in a fixed position by a locking mechanism comprising a plurality of balls 33 nested in radial openings 34 in the plunger 29 and annular shoulder 35 on the interior of the sleeve 30 (see FIG. 3). The balls 33 are held on the shoulder 35, as shown, by a pin 36 secured to the underside of the diaphragm 17. The pin 36 is provided with a tapered portion 37 at a location slightly below the balls 33. Below the tapered portion 37 of the pin includes a depending stem 38 which serves as a ball retainer. Thus, when the pin 36 is raised to a position where the tapered portion 37 is adjacent the balls, the plunger 29 will be actuated downwardly, provided the hand lever 15 is in its valve opening position. This movement of the plunger 29 results because of the strong force in the spring 22 and a relatively weaker force of the spring 32. When the plunger 29 moves downward the fulcrum 16 is released to the dotted line position shown in FIG. 2, whereby the valve stem 25 is disengaged from the hand lever 15.

The diaphragm 17 is actuated upwardly by suction (or reduction in pressure) in a chamber 39 formed by a recess in the housing 18 above the diaphragm. This suction results from the flow of liquid through the main valve 13, but while air is allowed to pass into the chamber 39 such as when the discharge end of the nozzle 14 is not submerged, the pressure in the diaphragm chamber 39 is not reduced sufficiently to deflect the diaphragm 17 to the tipping position of the locking mechanism.

As shown in FIG. 2, the chamber 39 between the housing 18 and the diaphragm 17 communicates with a tube 40, the open end of which is at 41 adjacent the outlet of the nozzle 14. The opening 41 extends through the side wall of the nozzle 14 and is removed from the flowstream through the nozzle.

Communicating with the tube 40 at its other end is a passageway 42 in the body 12 which in turn communicates with a passageway 43 in the housing 18. As shown in detail in FIG. 4, the latter passageway 43 connects with one end of an opening 44' which contains a hollow cylindrical valve chamber 44 in which is slidably retained a control valve member 45. The opening 44' extends from the outer surface of the housing 18 to a cavity 51 therein. The valve member 45 is connected to a spring 46 which is seated at the end of the chamber 44 near the passageway opening 43. Connecting the chamber 44 and the diaphragm chamber 39 is another small passageway 47. The valve chamber has ports 43' and 47' aligned with passageways 43 and 47 respectively. The valve member 45 is retained by and normally urged by the spring 46 against a shoulder 48 around an opening 49 at the end of the chamber 44, and when in this position it does not cover the openings of either passageway 43 or 47, so air can pass freely from one passageway to another. At its outer end the valve member 45 has an extended cylindrical nose portion 50 having a reduced diameter and a rounded end that extends through the opening 49 and into the cavity 51 in the housing 18 above the diaphragm chamber 39. The amount that the nose portion 50 extends beyond the opening 49 is more than the amount of axial movement required by the valve member 45 to cover the opening of the passageway 47.

Mounted within the cavity 51 of the housing 18 which is attached to the body 12 of the nozzle assembly 10 is a rotary timer mechanism 52 having a centrally located shaft member 53 adapted to be driven at a constant angular velocity. The timer mechanism 52 or movement may be of any suitable type that is commercially available, and generally comprises a main spring, a standard gear train, and an escapement, and when wound or turned in one direction and released, it will drive the central shaft 53 in the opposite direction at a constant angular velocity. Since such timing mechanisms are well known, I will not describe the mechanism 52 in detail. One commercial type which may be uitlized is a "Number 1600 RK1–60D12, self-winding timer movement," manufactured by Robertshaw Controls Company.

Fixed to the lower end of the central shaft is a radially extending arm 54 having an end portion 55 that is rounded in plan form to form a cam member as shown in FIG. 6. The central shaft 53 and the cam member 55 are located within the cavity 31 so that as the shaft rotates, the cam member 55 will engage the rounded nose 50 of the control valve 45 causing it to move axially and block the the passageway 47.

At its upper end the central shaft 53 is fixed to a control knob 56 which may have a generally cylindrical shape and to which is fixed a radially extending pointer 57 as shown in FIGS. 2 and 5. Scribed on the upper surface 58 of the housing 18 around the edge of the knob 56 are a series of circumferentially spaced apart indicator marks 59 that can be located appropriately to indicate increments of liquid volume. The aforesaid marks 59 can be readily established within a practical range of accuracy by equating the constant pump rate applied to the nozzle assembly and the rate of angular velocity of the timer shaft 53.

The diaphragm chamber 39 also communicates with a flow passageway 60 which extends through the housing 18 and connects with a passageway 61 that terminates immediately below the valve 13. The flow passageway of the main valve 13 is designed to provide a venturi effect on the diaphragm 17. As shown, a ring 62 is mounted in the passageway below the valve seat. The interior of the ring has a tapered surface which provides converged or restricted throat 63. Immediately below the throat 63 is an annular groove to which passageway 61 is connected.

In order that the restricted or venturi pasageway may be adjusted in flow area for various positions of the valve 13, other than closed, and thereby secure that sufficient suction will be developed at low rates of flow (e.g. 2 or 2.5 g.p.m.), as well as at high rates (e.g. 12 to 16 g.p.m.), including the intermediate values of rates of flow, the upper part of the valve stem is provided with an inverted frusto-conical portion 64. The latter's upper portion has a frusto-conical section 65 of wider angle adjacent the valve seat. These frusto-conic sections 64 and 65 so regulate the restricted flow area through the valve for the various open positions of valve 13 that a high degree of suction is developed at the inlet of the diaphragm chamber 39 through the passageway 47 at the various rates of flow of liquid through the nozzle 14 which are encountered in practice.

In operation, assuming that the fulcrum 16 is in the locked position, and it is desired to fill the container shown in FIG. 1 with a predetermined number of gallons of liquid from a pump to which the automatic valve assembly 10 is connected, the nozzle 14 is placed as shown. The operator then turns the control knob 56 on the outside of the housing 18 to a mark 59 indicating the desired number of gallons to be dispensed. This mark has previously been made to indicate the number of gallons that would be dispensed for the particular pump flow rate that is provided. When the knob 56 is released, the self-winding timer mechanism 52 commences to rotate the shaft 53 in the opposite direction as the valve handle 15 is lifted to the dotted line position of FIG. 2. Since the fulcrum 16 is held in the fixed position, the valve stem 25 will be lifted and the main valve 13 will open. As liquid flows into the container, air will be drawn into the opening 41 through the tube 40, the passageways 43 and 47, into the diaphragm chamber 39, and thence from the chamber 39 through the passageways 60 and 61 to the liquid flowing through the valve 13. When the shaft 53 of the timer mechanism 52 has rotated back to the zero position, the cam arm member 54 engages the rounded nose 50 of the control valve 45 and forces it rearward, blocking the passageway 47 and causing air to be evacuated from the diaphragm chamber 39. A differential pressure acting on the diaphragm 17 then causes it to move upwardly against the force of a spring 66 which connects the diaphragm to the inner wall of the housing 18. As it moves upward, the diaphragm carries with it the pin 36, thereby causing the ball 33 to be released as previously described. The fulcrum plunger 29 and its fulcrum 16 are then moved downwardly by the spring 22 acting through the valve stem 25 whereby the main valve 13 is automatically closed and the flow to the container is shut off. When the valve handle 15 is released to the closed position, the fulcrum plunger 29 is reset by the spring 32 to the position where the balls 33 will be deflected outwardly to their locking position, the balls being forced to this position by the conical surface 37 or the taper on pin 36 which will have been released to the normal position by the diaphragm spring 66 when the main valve 13 is closed.

In practice, the spring 66 is so designed that only a slight suction or reduction in pressure in the diaphragm chamber 39 is required to lift the ball release 38 to the fulcrum tripping position. Thus, the action in closing the main valve 13 is almost instantaneous when the cam member 54 engages the control valve 45 and causes it to close the passageway 47, thereby shutting off the air entering the chamber 39.

To those skilled in the art to which this invention relates, many changes in construction and widely differing embodiments and applications of the invention will suggest themselves without departing from the spirit and scope of the invention. The disclosures and description herein are purely illustrative and are not intended to be in any sense limiting.

We claim:
1. In an automatic shut-off fluid dispensing nozzle comprising a main body member, a nozzle attached to said body member, a valve mechanism for controlling the flow of fluid through the nozzle, means forming a chamber in the body member, a diaphragm in said chamber, said valve mechanism including a main valve having a valve opening on the discharge side thereof constricted in the direction of flow therethrough, said constricted opening and said chamber being in communication with one another, an orifice in and disposed adjacent to the discharge end of the nozzle, a conduit leading from said orifice and communicating with said chamber whereby air is drawn from said orifice through the diaphragm chamber into said constricted valve opening when fluid flows through the latter and said orifice is exposed, air being withdrawn from the diaphragm chamber when said orifice is closed by submergence in dispensed liquid or when said conduit is closed to the passage of air therethrough, whereby a pressure differential acts on said diaphragm to deflect the same, spring means constantly urging said main valve to the closed position, a plunger mounted in the body member adjacent to the diaphragm to move toward and away from the diaphragm, a hand lever for operating the main valve, said hand lever having a fulcrum carried by said plunger, said plunger being movable between a secured position in which the hand lever is adapted to open the main valve and a released position in which the hand lever is rendered inoperative to open the main valve and releasable locking means for retaining said plunger in the fixed position when said orifice is clear of submergence and said auxiliary valve is open, a housing member attached to said body member and having a lower wall which forms the top wall of said chamber, said housing member having a cavity in the upper portion thereof above said wall, said housing member having an opening which extends from the outer surface of said housing member to said cavity, a hollow cylindrical valve chamber positioned within said opening, said valve chamber having a first port and a second port therein, said conduit including a first passageway extending through said housing member and communicating with the first port of said valve chamber, a second passageway in said housing extending from said second port of said valve chamber to said diaphragm chamber, a shiftable auxiliary valve member in said valve chamber normally urged by a spring against a shoulder surrounding an opening at the end of said chamber adjacent said cavity, said valve member having a nose portion extending through said opening into said cavity, said auxiliary valve member being normally biased by said spring to a position in which it closes neither of said ports whereby air may flow from one passageway to the other through said hollow cylindrical valve chamber, said auxiliary valve member being shiftable to a closed position in which it closes at least one of said ports and blocks flow of air through said valve chamber, said nose portion extending into said cavity a distance greater than the distance the auxiliary valve member must move from its normal position to the position at which it closes at least one of said ports, and time control mechanism for effecting shifting of said auxiliary valve member to closed position after a lapse of a predetermined amount of time and before said nozzle orifice is submerged thereby cutting off the flow of air through said conduit into said diaphragm chamber and releasing said locking means, whereby said main valve is biased by said spring to the closed position, said mechanism including a rotary shaft and a cam carried thereby and moved into engagement with said auxiliary valve member nose portion to shift the auxiliary valve member to said closed portion.

2. The invention according to claim 1 wherein said nose portion of said auxiliary valve member is rounded and wherein said cam is rounded and wherein said cam is mounted at the very end of said rotary shaft.

References Cited by the Examiner
UNITED STATES PATENTS

| | | | |
|---|---|---|---|
| 2,075,812 | 4/37 | Kerr et al. | 251—263 X |
| 2,208,956 | 7/40 | Allenbaugh. | |
| 2,224,540 | 12/40 | Fraser | 222—17 |
| 2,557,336 | 6/51 | Buchanan | 222—20 |
| 2,906,301 | 9/59 | Mannon | 222—70 |
| 2,955,725 | 10/60 | Niederst | 222—17 |

LAVERNE D. GEIGER, *Primary Examiner.*